(12) United States Patent
Yun et al.

(10) Patent No.: US 11,711,602 B2
(45) Date of Patent: Jul. 25, 2023

(54) CAMERA MODULE

(71) Applicant: Samsung Electro-Mechanics Co., Ltd., Suwon-si (KR)

(72) Inventors: Tae Ho Yun, Suwon-si (KR); Sang Jong Lee, Suwon-si (KR); Kyung Ho Lee, Suwon-si (KR); Chul Kyu Kim, Suwon-si (KR); Han Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/243,676

(22) Filed: Apr. 29, 2021

(65) Prior Publication Data

US 2022/0086315 A1 Mar. 17, 2022

(30) Foreign Application Priority Data

Sep. 16, 2020 (KR) .................... 10-2020-0119390

(51) Int. Cl.
| | |
|---|---|
| *H04N 5/225* | (2006.01) |
| *H04N 5/232* | (2006.01) |
| *G03B 13/32* | (2021.01) |
| *H04N 23/55* | (2023.01) |
| *H04M 1/02* | (2006.01) |
| *H04N 23/54* | (2023.01) |

(52) U.S. Cl.
CPC .......... *H04N 23/55* (2023.01); *H04M 1/0264* (2013.01); *H04N 23/54* (2023.01); *H04M 2250/52* (2013.01)

(58) Field of Classification Search
CPC ........ H04N 23/50; H04N 23/51; H04N 23/54; H04N 23/55; H04N 23/67–676; G03B 13/32–36
USPC ......................................................... 348/345
See application file for complete search history.

(56) References Cited

U.S. PATENT DOCUMENTS

| | | | | |
|---|---|---|---|---|
| 5,486,728 A | * | 1/1996 | Hirama | H02K 1/06 310/40 MM |
| 8,149,520 B2 | * | 4/2012 | Kurosawa | H02K 41/03 310/154.22 |
| 8,873,172 B2 | * | 10/2014 | Tanaka | H02K 11/21 359/823 |

(Continued)

FOREIGN PATENT DOCUMENTS

| | | | | |
|---|---|---|---|---|
| CN | 110266845 A | * | 9/2019 | .......... H04M 1/0264 |
| DE | 10 2013 102 496 A1 | | 12/2013 | |

(Continued)

OTHER PUBLICATIONS

Korean Office Action dated Nov. 26, 2021 in the corresponding Korean Patent Application No. 10-2020-0119390 (6 pages in English language and 5 pages in Korean language).

(Continued)

*Primary Examiner* — Anthony J Daniels
(74) *Attorney, Agent, or Firm* — NSIP Law

(57) ABSTRACT

A camera module is provided. The camera module includes a lens module having at least one lens; a housing, configured to accommodate the lens module; and a driving unit, disposed between the lens module and the housing, and including a magnet portion and a coil portion, wherein the coil portion is disposed to surround the magnet portion.

25 Claims, 14 Drawing Sheets

(56) References Cited

U.S. PATENT DOCUMENTS

| | | | |
|---|---|---|---|
| 2008/0054731 A1* | 3/2008 | Tu | H02K 39/00 |
| | | | 310/15 |
| 2009/0067068 A1 | 3/2009 | Yu et al. | |
| 2009/0195087 A1 | 8/2009 | Kurosawa | |
| 2010/0182490 A1 | 7/2010 | Seol et al. | |
| 2012/0087022 A1 | 4/2012 | Tanaka et al. | |
| 2013/0321937 A1 | 12/2013 | Baik et al. | |
| 2020/0012072 A1 | 1/2020 | Wang et al. | |

FOREIGN PATENT DOCUMENTS

| | | | | |
|---|---|---|---|---|
| JP | 2009-189091 A | | 8/2009 | |
| JP | 2011-59442 A | | 3/2011 | |
| KR | 10-0866769 B1 | | 11/2008 | |
| KR | 10-0880672 B1 | | 2/2009 | |
| KR | 10-2009-0026023 A | | 3/2009 | |
| KR | 10-1185303 B1 | | 9/2012 | |
| KR | 10-1504350 B1 | | 3/2015 | |
| KR | 10-2018-0071603 | * | 6/2018 | H04N 5/225 |
| WO | WO-2006025161 A1 | * | 3/2006 | G02B 7/021 |
| WO | WO-2018074336 A1 | * | 4/2018 | G02B 7/021 |

OTHER PUBLICATIONS

Korean Office Action dated May 14, 2022, in counterpart Korean Patent Application No. 10-2020-0119390 (6 pages in English and 4 pages in Korean).

Indian Office Action dated Mar. 24, 2022 in the corresponding Indian Patent Application No. 202114020397. (5 pages in English).

* cited by examiner

CAMERA MODULE

CROSS-REFERENCE TO RELATED APPLICATION(S)

This application claims the benefit under 35 USC § 119(a) of Korean Patent Application No. 10-2020-0119390 filed on Sep. 16, 2020 in the Korean Intellectual Property Office, the entire disclosure of which is incorporated herein by reference for all purposes.

BACKGROUND

1. Field

The following description relates to a camera module.

2. Description of Related Art

Recently, camera modules have been used in mobile communication terminals such as smartphones, tablet personal computers (PCs) and laptop computers. Such camera modules may have an autofocusing function (AF) and an optical image stabilization (OIS) function in order to generate high-resolution images.

When performing the autofocusing function, a lens module may be moved in an optical axis direction by an actuator. To achieve that function, a plurality of ball members may be used to support the movement of the lens module in the optical axis direction. The plurality of ball members may support the lens module by being in contact with the lens module, and performing a rolling movement in the optical axis direction. The lens module and its housing may each have a ball rolling surface that is in contact with the plurality of ball members.

It is beneficial that all of the plurality of ball members support the lens module by being in contact with the lens module. However, it is very difficult to make the respective sizes of the plurality of ball members completely identical to each other during their manufacturing process, and the respective sizes of the plurality of ball members may thus actually be different from each other.

When the respective sizes of the plurality of ball members are different from each other, only some of the ball members may come into contact with the lens module. Accordingly, a tilt phenomenon may occur in which the lens module is tilted when moved in the optical axis direction.

Further, in a process in which the lens module is moved in the optical axis direction, a ball member in contact with the lens module may be changed to another ball member, and the tilt phenomenon in which the lens module is tilted may thus occur continuously.

Additionally, the tilt phenomenon may also occur when there is a deviation between angles of the ball rolling surfaces in the optical axis direction. Accordingly, a large deviation may occur in the linearity of the lens module.

In performing the autofocusing function, it is important that the lens module be moved parallel to the optical axis direction, and it is thus beneficial to prevent the tilt phenomenon from occurring when the lens module is moved.

Additionally, it is a recent trend that the camera module used in the mobile communications terminal gradually have a smaller size. The smaller the size of the camera module, the greater the deterioration of resolution thereof, due to the tilted lens module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a lens module; a housing, configured to accommodate the lens module; and a driving unit, disposed between the lens module and the housing, and comprising a magnet portion and a coil portion, wherein the coil portion is disposed to surround the magnet portion.

The magnet portion may include a magnet including an even number of north (N) poles and south (S) poles, and the coil portion comprises an odd number of coils.

The magnet portion may include a magnet having at least one of two north (N) poles facing each other, and two south (S) poles facing each other.

The magnet may be configured to have one of an S pole, an N pole, an N pole and an S pole, sequentially arranged in an optical axis direction, and the N pole, the S pole, the S pole and the N pole, sequentially arranged in the optical axis direction.

The coil portion may include a first coil, a second coil and a third coil, arranged in an optical axis direction, wherein a polarity of the magnet of the magnet portion that faces the first coil is different from a polarity of the magnet of the magnet portion that faces the second coil, and the polarity of the magnet of the magnet portion that faces the second coil may be different from a polarity of the magnet of the magnet portion that faces the third coil.

The first coil and the second coil may be configured to have current flow directions opposite to each other, and wherein the second coil and the third coil may be configured to have current flow directions opposite to each other.

The magnet portion may include a magnet having an odd number of north (N) poles and south (S) poles, and the coil portion comprises an even number of coils.

The magnet may include two N poles facing each other, and two S poles facing each other.

The magnet may be configured to have one of a configuration in which the S pole, the N pole, the N pole, the S pole, the S pole and the N pole are sequentially arranged in an optical axis direction, and a configuration in which the N pole, the S pole, the S pole, the N pole, the N pole and the S pole are sequentially arranged in the optical axis direction.

The coil portion may include a first coil and a second coil, disposed in an optical axis direction, wherein a polarity of the magnet of the magnet portion that faces the first coil may be different from a polarity of the magnet of the magnet portion that faces the second coil, and wherein the first coil and the second coil may be configured to have current flow directions that are opposite to each other.

The magnet portion may include a magnet and a magnet housing, the magnet being disposed in the magnet housing, and wherein the coil portion may include a coil member and a coil housing, the coil member being disposed on an outer surface of the coil housing.

The magnet portion may be sliding-moved with respect to the coil portion.

The coil housing may be an oilless bearing.

A pulling yoke may be disposed to be spaced apart from the magnet portion in an optical axis direction.

A protrusion to which the magnet portion is fixed may be disposed on the lens module, and wherein a mounting portion to which the coil portion is fixed may be disposed in the housing, wherein the protrusion may be disposed above the mounting portion in an optical axis direction, and wherein a bottom surface of the protrusion and a top surface of the mounting portion may be configured to face each other in the optical axis direction.

The camera module may further include a position detection unit, configured to detect a position of the lens module, wherein the position detection unit may include a sensing yoke disposed on the lens module and a position sensor disposed to face the sensing yoke.

A shielding wall may be disposed in an area between the driving unit and the position detection unit.

In a general aspect, a camera module includes a lens module, including at least one lens; a housing, configured to accommodate the lens module; and a driving unit, including a magnet portion disposed on the lens module and a coil portion disposed in the housing, wherein the coil portion may be configured to have a cylindrical shape, and the magnet portion is disposed in an inner area of the coil portion.

In a general aspect, an electronic device includes a camera module, including a housing; a lens module; and one or more driving units, each driving unit including a magnet portion disposed on the lens module, and a coil portion disposed in the housing; wherein the magnet portion comprises two or more magnets coupled to each other, and disposed in an optical axis direction, and wherein the magnet portion is disposed in an internal area of the coil portion.

The two or more magnets may be configured to have at least two first polarities, and at least two second polarities.

Poles of the two or more magnets having the first polarity may be disposed to face each other, and poles of the two or more magnets having the second polarity may be disposed to face each other.

The coil portion may include coil members including an odd number of coils when an even number of magnets are coupled to each other.

The one or more driving units may further include a pulling yoke disposed to face the magnet portion in the optical axis direction.

The magnet portion and the coil portion may be configured to slidably move with respect to each other.

The magnet portion may be a movable member, and the coil portion is a fixed member.

Other features and aspects will be apparent from the following detailed description, the drawings, and the claims.

Figure 1:
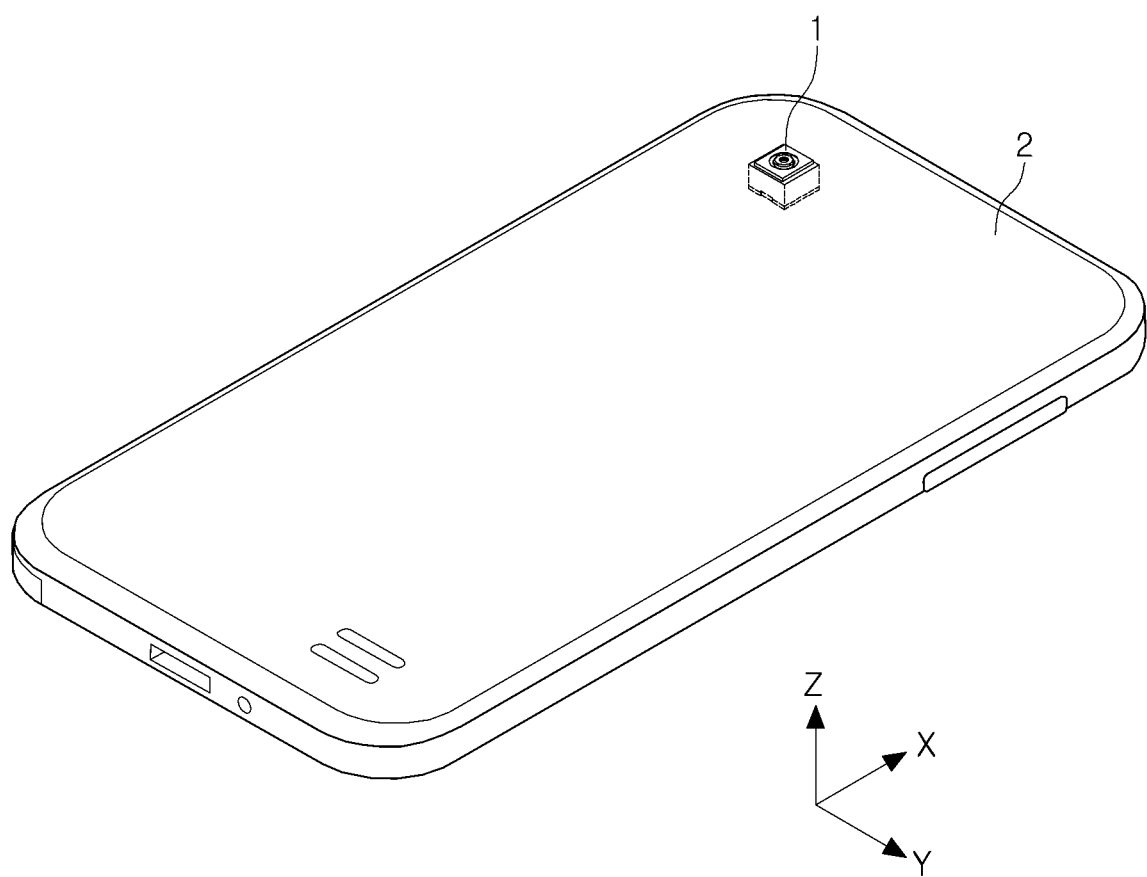
FIG. 1 is a perspective view of an example portable electronic device, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Figure 2:
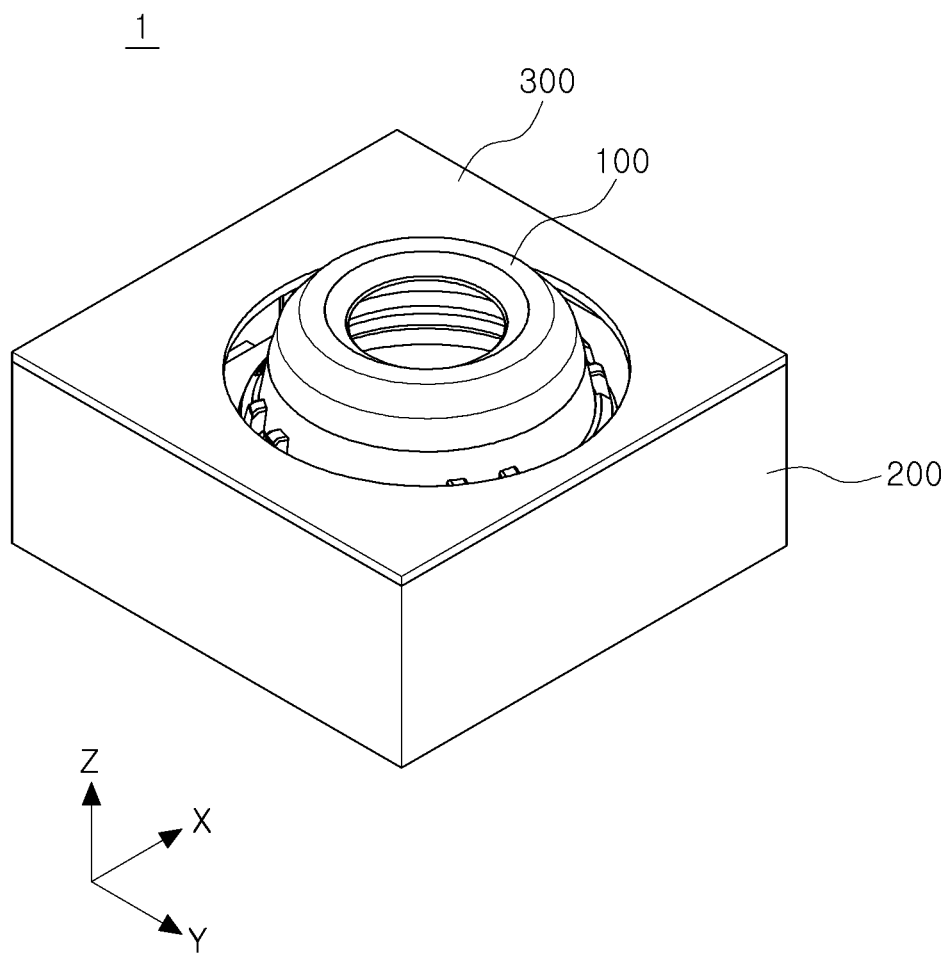
FIG. 2 is a perspective view of an example camera module, in accordance with one or more embodiments.

FIG. 1 is a perspective view of an example portable electronic device, in accordance with one or more embodiments; and FIG. 2 is a perspective view of an example camera module, in accordance with one or more embodiments.

Figure 3:
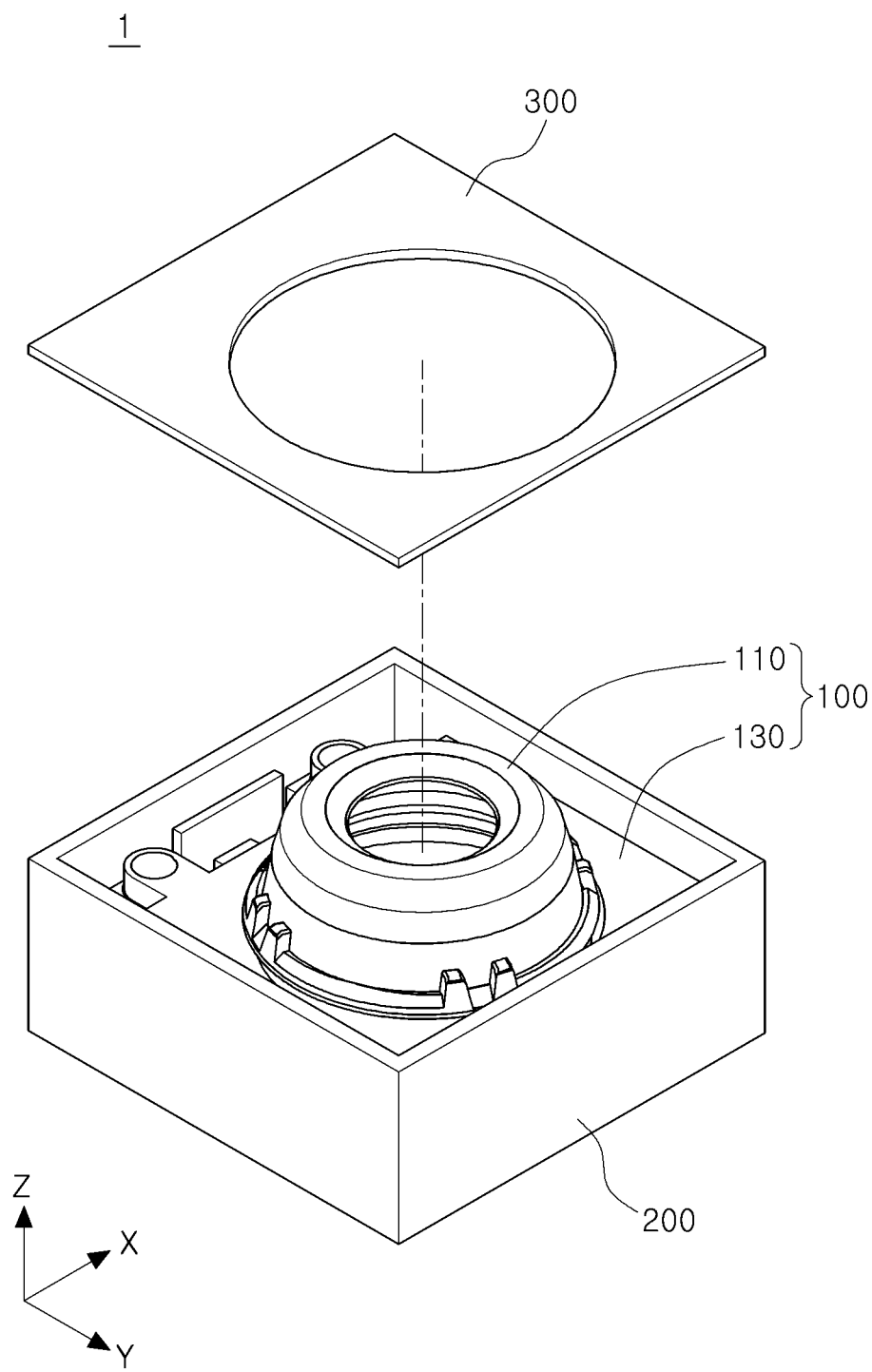
FIG. 3 is a perspective view illustrating a state in which a case is separated from an example camera module, in accordance with one or more embodiments.
Figure 4:
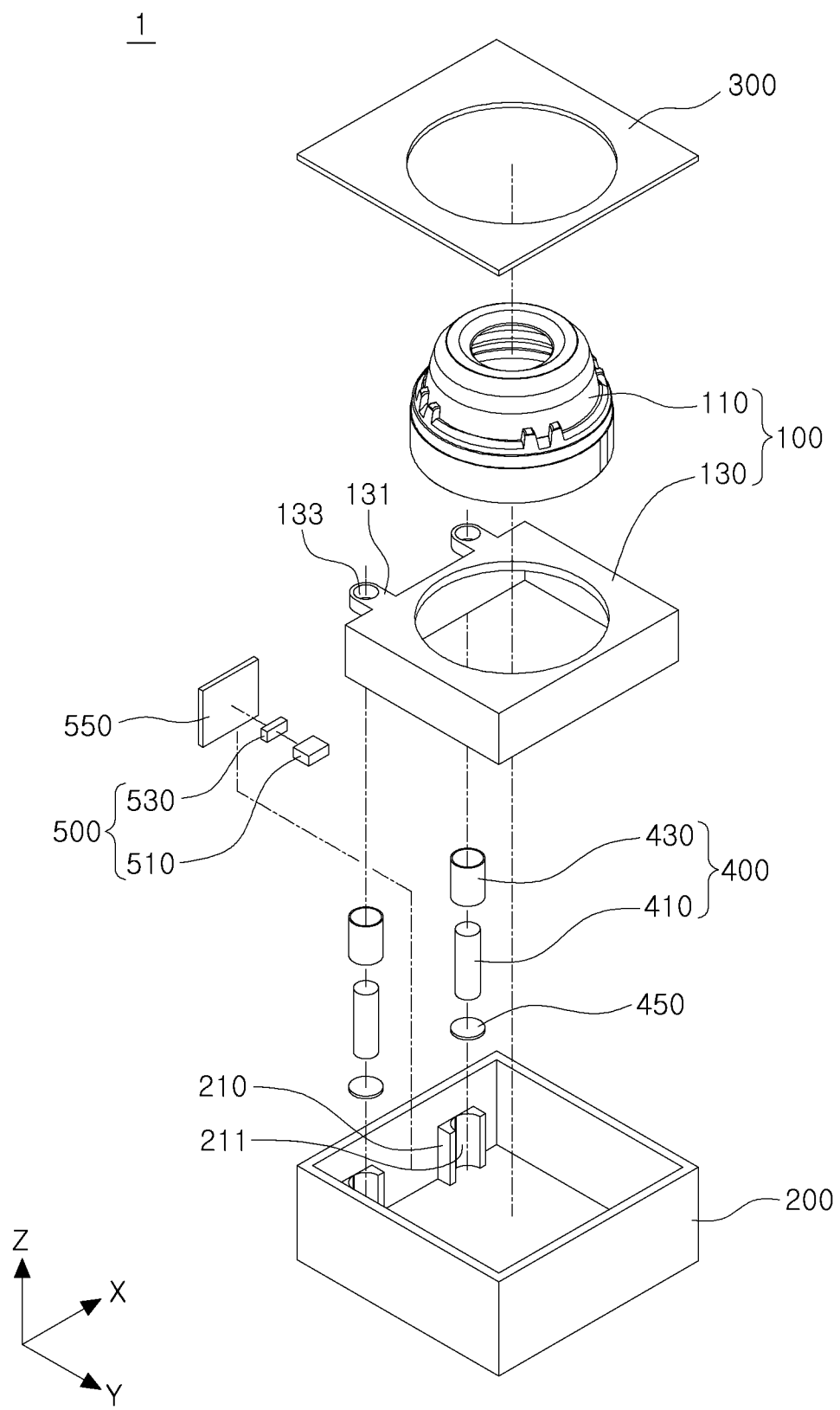
FIG. 4 is an exploded perspective view of an example camera module, in accordance with one or more embodiments.

FIG. 3 is a perspective view illustrating a state in which a case is separated from the camera module, in accordance with one or more embodiments; and FIG. 4 is an exploded perspective view of the camera module, in accordance with one or more embodiments.

Referring to FIG. 1, a portable electronic device 2 may be a portable electronic device such as, but not limited to, a mobile communications terminal, a smartphone or a tablet personal computer (PC).

As shown in FIG. 1, a camera module 1 may be mounted on the portable electronic device 2 to image a subject.

Referring to FIGS. 2 through 4, the camera module, in accordance with one or more embodiments may include a lens module 100, a driving unit 400 configured to move the lens module 100, a housing 200 that accommodates the lens module 100 and a case 300.

The lens module 100 may include a lens barrel 110 and a carrier 130.

The lens barrel 110 may accommodate at least one lens that images the subject. When a plurality of lenses are disposed in the lens barrel 110, the plurality of lenses may be mounted inside the lens barrel 110 along an optical axis. The lens barrel 110 may be formed to have a hollow cylindrical shape.

The lens barrel 110 may be coupled with the carrier 130. In an example, the carrier 130 may be formed to have a box shape.

The lens barrel 110 and the carrier 130 may be accommodated in the housing 200. The case 300 may be coupled with the housing 200.

The lens barrel 110 may be moved in the optical axis (Z-axis) direction together with the carrier 130.

That is, the lens module 100 may be moved in the optical axis (Z-axis) direction to perform an autofocusing function, and a driving unit 400 may be provided to move the lens module 100.

The image sensor module may be disposed in a lower portion of the housing 200. The image sensor module is a device that converts light incident through the lens module 100 into an electrical signal.

The image sensor module may include an image sensor and a printed circuit board connected to the image sensor, and may further include an infrared filter.

The infrared filter may block light in the infrared region from the light incident through the lens module.

The image sensor may convert the light incident through the lens module 100 into the electrical signal. In an example, the image sensor may be a charge coupled device (CCD) or a complementary metal-oxide semiconductor (CMOS), but is not limited thereto.

The electrical signal converted by the image sensor may be output as an image through a display unit of the portable electronic device 2.

The image sensor may be fixed to the printed circuit board and electrically connected to the printed circuit board by wire bonding.

The driving unit 400 may generate a driving force to allow the lens module 100 to be moved in the optical axis (Z-axis) direction.

The driving unit 400 may be disposed between the lens module 100 and the housing 200. In a non-limiting example, two driving units 400 may be provided, and the two driving units 400 may each be disposed on one side of the lens module 100. However, this is only an example, and less than two driving units 400, or more than two driving units 400 may be provided. The two driving units 400 may be disposed to be spaced apart from each other along an axis (e.g. X-axis) perpendicular to the optical axis (Z-axis). Alternatively, the two driving units 400 may be disposed to be spaced apart from each other by a predetermined distance from another axis (e.g., Y-axis) perpendicular to the optical axis (Z-axis).

The driving unit 400 may include a magnet portion 410 and a coil portion 430. The magnet portion 410 may be disposed on the lens module 100, and the coil portion 430 may be disposed to face the magnet portion 410.

In an example, the magnet portion 410 may be mounted on the carrier 130, and the coil portion 430 may be disposed in the housing 200. The coil portion 430 may be disposed to surround the magnet portion 410.

A protrusion 131 to which the magnet portion 410 is fixed may be disposed on the carrier 130. In an example, the protrusion 131 may protrude from one side surface of the carrier 130. The protrusion 131 may include a mounting hole 133 in which the magnet portion 410 is disposed. The magnet portion 410 may be fitted and coupled to the mounting hole 133.

A mounting portion 210 to which the coil portion 430 is fixed may be disposed in the housing 200. For example, the mounting portion 210 may protrude from an inner surface of the housing 200. In a non-limiting example, the mounting portion 210 may have a concave curved portion corresponding to an outer shape of the coil portion 430.

When power is applied to the coil portion 430, the carrier 130 may be moved in the optical axis (Z-axis) direction by an electromagnetic influence between the magnet portion 410 and the coil portion 430.

The lens barrel 110 may be mounted on the carrier 130, and the lens barrel 110 may thus also be moved in the optical axis (Z-axis) direction based on the movement of the carrier 130.

A pulling yoke 450 may be disposed to face the magnet portion 410 of the driving unit 400 in the optical axis (Z-axis) direction. The pulling yoke 450 may be mounted in the housing 200. In an example, the pulling yoke 450 may be disposed on an inner bottom surface of the housing 200 to face the magnet portion 410 in the optical axis (Z-axis) direction.

The pulling yoke 450 may be a magnetic material. In an example, the pulling yoke 450 may be a magnetic metal or a magnet. Therefore, an attractive force may be generated between the pulling yoke 450 and the magnet portion 410 in the optical axis (Z-axis) direction.

The magnet portion 410 may be mounted on the lens module 100, and the attraction between the pulling yoke 450 and the magnet portion 410 may thus prevent the lens module 100 from being deviated outward from the housing 200.

In an example, an elastic member that elastically supports the lens module 100 may be implemented instead of the pulling yoke 450. In this example, a first side side of the elastic member may be coupled to the lens module 100, and a second side of the elastic member may be coupled to the housing 200.

The specific configuration of the driving unit 400 is described below with reference to FIGS. 5 through 8.

The examples may implement a closed loop control method that senses and feeds back the position of the lens module 100.

Therefore, a position detection unit 500 may be provided for the closed loop control. The position detection unit 500 may include a position sensor 530 and a sensing yoke 510.

The position sensor 530 may be a hall sensor, and the sensing yoke 510 may be a magnet.

The position sensor 530 and the sensing yoke 510 may be disposed to face each other. In an example, the sensing yoke 510 may be mounted on the lens module 100, and the position sensor 530 may be mounted in the housing 200.

In an example, the sensing yoke 510 may be mounted on one surface of the carrier 130 of the lens module 100. The position sensor 530 may be disposed to be electrically connected to a substrate 550 disposed in the housing 200.

Meanwhile, the position sensor 530 may be integrally formed with a driver integrated circuit (IC) that applies the power to the coil portion 430.

When the driving unit 400 moves the lens module 100 in the optical axis (Z-axis) direction, the sensing yoke 510 mounted on the lens module 100 may also be moved in the optical axis (Z-axis) direction, and the position of the lens module 100 may thus be detected by the position sensor 530 facing the sensing yoke 510.

In an example, the position sensor 530 may be a sensing coil, and the sensing yoke 510 may be a conductor and/or a magnetic material.

The sensing coil 530 and sensing yoke 510 may be disposed to face each other, and the position of the lens module 100 may be detected based on an inductance of the sensing coil, which is changed by the movement of the sensing yoke 510.

Figure 5:
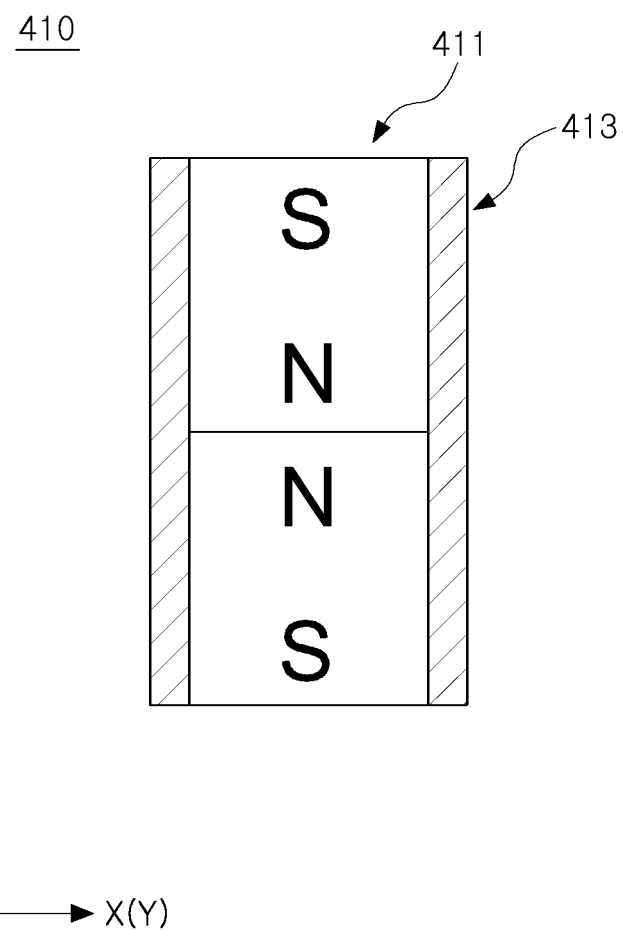
FIG. 5 is a schematic cross-sectional view of a magnet portion.
Figure 6:
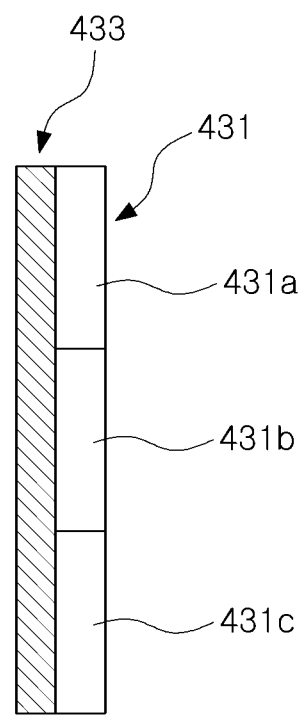
FIG. 6 is a schematic cross-sectional view of a coil portion.
Figure 6:
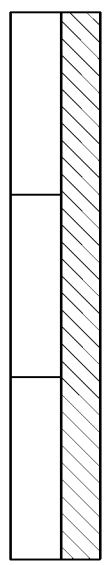

FIG. 5 is a schematic cross-sectional view of a magnet portion, and FIG. 6 is a schematic cross-sectional view of a coil portion.

Figure 7:
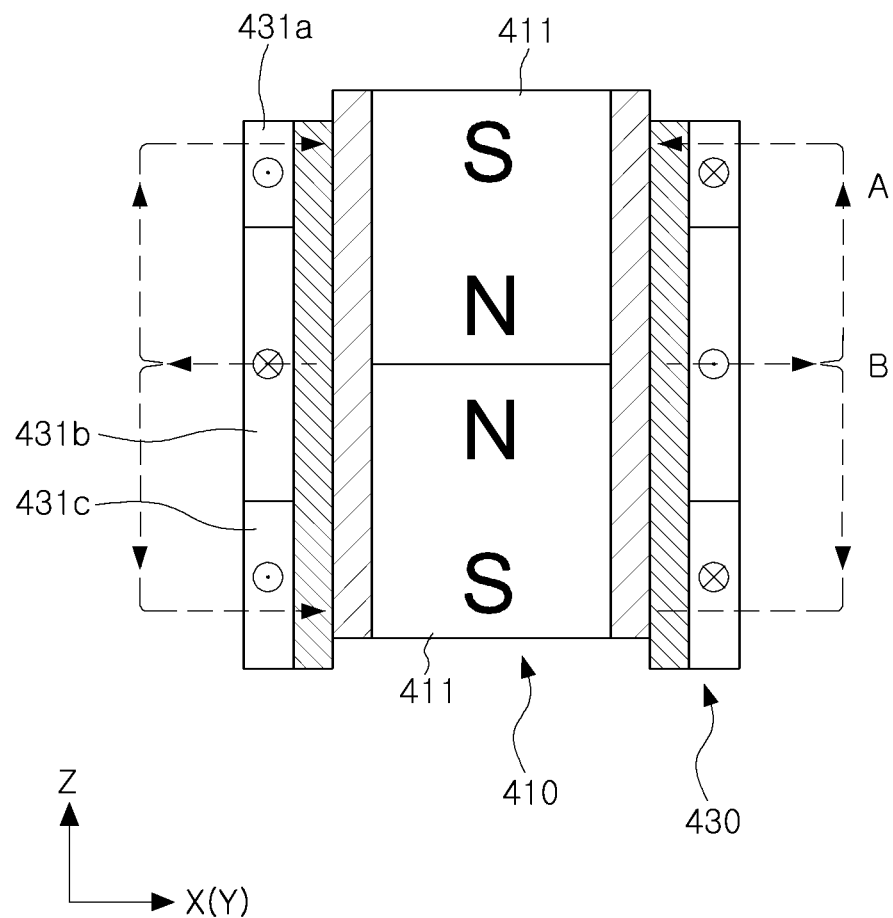
FIG. 7 is a schematic side-sectional view of a driving unit.

Additionally, FIG. 7 is a schematic side-sectional view of a driving unit.

Figure 8A:
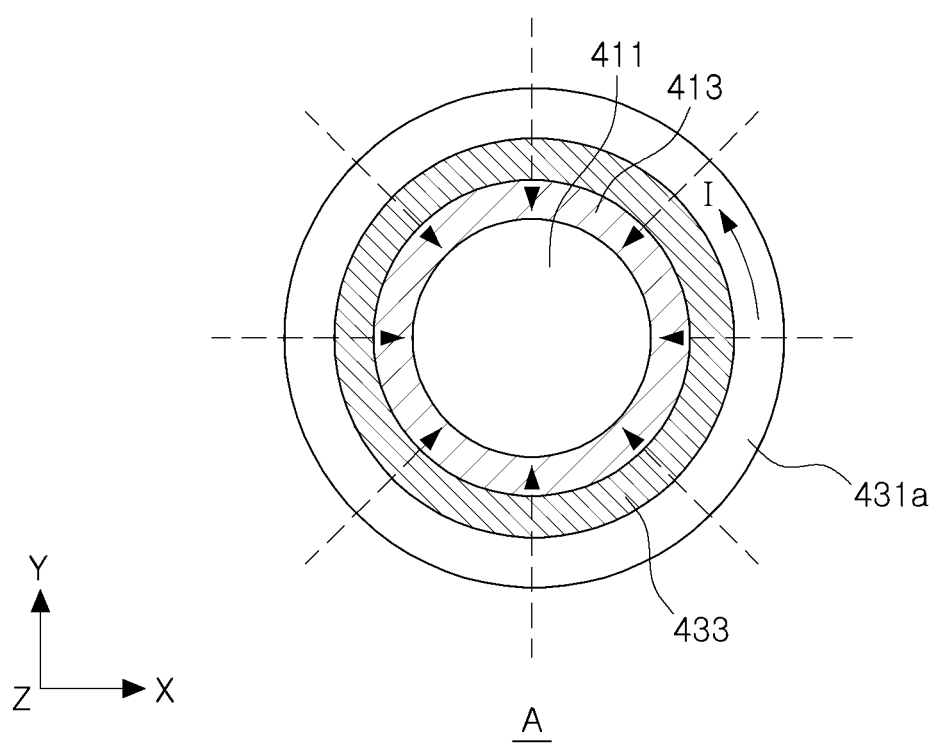
FIG. 8A is a plan cross-sectional view of portion A of FIG. 7.
Figure 8B:
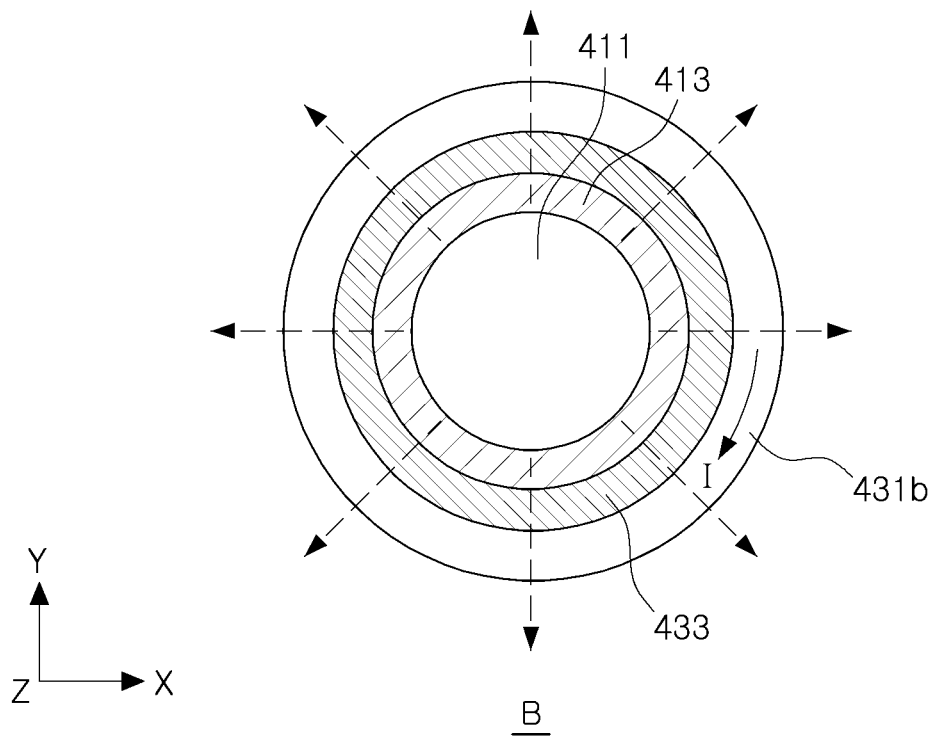
FIG. 8B is a plan cross-sectional view of portion B of FIG. 7.

FIG. 8A is a plan cross-sectional view of portion A of FIG. 7, and FIG. 8B is a plan cross-sectional view of portion B of FIG. 7.

First, referring to FIG. 5, the magnet portion 410 may include a magnet 411 and a magnet housing 413.

The magnet 411 may have a cylindrical shape. In an example, the magnet 411 may have the shape of a cylinder having a length in the optical axis (Z-axis) direction.

The magnet 411 may have a first polarity and a second polarity opposite to each other. The magnet 411 may include a plurality of magnets, and may have at least two first polarities and at least two second polarities. The first polarity may be the polarity of a north (N) pole or south (S) pole, and the second polarity may be the polarity of the S pole or N pole, which is opposite to the first polarity.

In an example, the magnet 411 may have at least two N poles and at least two S poles.

The magnet 411 may have at least one of the two N poles facing each other and the two S poles facing each other.

The magnet 411 may allow their poles having the same polarity to face each other. That is, the poles having the first polarity may be disposed to face each other, or the poles having the second polarity may be disposed to face each other.

In an example, the magnet 411 may have a shape in which the S pole, the N pole, the N pole and the S pole are arranged in the optical axis (Z-axis) direction. Alternatively, the magnet 411 may have a shape in which the N pole, the S pole, the S pole and the N pole are arranged in the optical axis (Z-axis) direction.

In a non-limiting example, the magnet 411 may be one magnet, but is not limited to this shape. The magnet 411 may have a shape in which two or more magnets are coupled with each other.

In a non-limiting example, the magnet housing 413 may have a shape of a cylinder having an inner space and open top and bottom. The magnet 411 may be disposed in the inner space of the magnet housing 413.

The magnet 411 may be fixedly disposed in the magnet housing 413.

In a non-limiting example, the magnet housing 413 may be made of a non-magnetic material or plastic material.

Referring to FIG. 6, the coil portion 430 may include a coil member 431 and a coil housing 433.

The coil housing 433 may have a shape of a cylinder having an inner space and open top and bottom.

The magnet portion 410 may be disposed in the inner space of the coil housing 433. The coil housing 433 and the magnet housing 413 may be in surface or line contact with each other.

When performing the autofocusing function, one of the coil housing 433 and the magnet housing 413 may be sliding-moved with respect to the other.

In an example, when the magnet portion 410 is a movable member and the coil portion 430 is a fixed member, the magnet portion 410 may be sliding-moved or slidably moved with respect to the coil portion 430.

In an example, the coil housing 433 may be an oilless bearing. Therefore, it is possible to reduce friction between the magnet portion 410 and the coil portion 430 during the autofocusing.

The coil member 431 may include, as a non-limiting example, at least three coils. For example, referring to FIG. 6, the coil member 431 may include a first coil 431a, a second coil 431b and a third coil 431c. The first coil 431a, the second coil 431b and the third coil 431c may be arranged on an outer surface of the coil housing 433. Although FIG. 6 indicates that the coil member 431 may include three coils, this is only an example, and the coil member 431 may include less than three coils or more than three coils based on the examples.

Each of the coils may be a winding coil, and may be wound on the outer surface of the coil housing 433 for example.

In the camera module 1 according to an example, the coil member 431 may include an odd number of coils when the magnet 411 has an even number of poles having the first polarity and an even number of poles having the second polarity.

Referring to FIG. 7, the magnet 411 may have two north (N) poles and two south (S) poles, and the coil member 431 may include the three coils.

The coil member 431 may include the odd number of coils even when an even number of magnets are coupled to each other instead of one magnet.

The first coil 431a, the second coil 431b and the third coil 431c may be arranged in the optical axis (Z-axis) direction. The first coil 431a, the second coil 431b and the third coil 431c may be arranged adjacent to each other. However, the three coils are not limited to this arrangement, and the first coil 431a, the second coil 431b and the third coil 431c may be arranged to be spaced apart from each other.

The magnet 411 facing the first coil 431a and the magnet 411 facing the second coil 431b may have polarities different from each other. Additionally, the magnet 411 facing the second coil 431b and the magnet 411 facing the third coil 431c may have polarities different from each other.

The adjacent coils may have current flow directions opposite to each other.

For example, the first coil 431a and the second coil 431b may have current flow directions opposite to each other. Additionally, the second coil 431b and the third coil 431c may have current flow directions opposite to each other. In an example, the first coil 431a and the third coil 431c may have the same current flow direction as each other.

Referring to FIG. 7, the magnet 411 may allow the poles having the same polarity to face each other. Therefore, a magnetic field between the poles having the same polarity and facing each other may have a direction perpendicular to the optical axis (Z-axis).

In an example, the magnet 411 may have two N poles and two S poles, with the two N poles facing each other. Therefore, the magnetic field may be formed between the two N poles facing each other from the magnet 411 toward the coil member 431 in the direction perpendicular to the optical axis (Z-axis).

In an example, the first coil 431a may be disposed to face the S pole of the magnet 411. For example, the first coil 431a may be disposed to face one of the two S poles of the magnet 411.

In an example, the second coil 431b may be disposed to face the N pole of the magnet 411. For example, the second coil 431b may be disposed to face the two N poles of the magnet 411.

In an example, the third coil 431c may be disposed to face the S pole of the magnet 411. For example, the third coil 431c may be disposed to face the other of the two S poles of the magnet 411.

The second coil 431b may have a current flow direction different from a current flow direction of the first coil 431a or third coil 431c.

Therefore, a driving force may be generated by an interaction between the magnet 411 and the coil member 431 in the optical axis (Z-axis) direction.

In an example, as illustrated in FIG. 8A, the magnetic field in portion A may be directed from the coil member 431 to the magnet 411, and the driving force may thus be generated by the interaction between magnet 411 and the coil member 431 in the optical axis (Z-axis) direction.

Additionally, as illustrated in FIG. 8B, the magnetic field in portion B may be directed from the magnet 411 to the coil member 431, and the driving force may thus be generated by the interaction between magnet 411 and the coil member 431 in the optical axis (Z-axis) direction.

Unlike the example illustrated in FIG. 7, the magnet 411 may have two S poles facing each other. In this example, the magnetic field may be formed between the two S poles facing each other from the coil member 431 toward the magnet 411 in the direction perpendicular to the optical axis (Z-axis).

In this example, the first coil 431a may be disposed to face the N pole of the magnet 411. For example, the first coil 431a may be disposed to face one of the two N poles of the magnet 411.

In an example the second coil 431b may be disposed to face the S pole of the magnet 411. For example, the second coil 431b may be disposed to face the two S poles of the magnet 411.

In an example, the third coil 431c may be disposed to face the N pole of the magnet 411. For example, the third coil 431c may be disposed to face the other of the two N poles of the magnet 411.

The second coil 431b may have a current flow direction different from a current flow direction of the first coil 431a or third coil 431c.

Therefore, a driving force may be generated by an interaction between the magnet 411 and the coil member 431 in the optical axis (Z-axis) direction.

In an example, the magnet portion 410 and the coil portion 430 may configure the driving unit 400, and serve as a guide portion that moves the lens module 100 parallel to the optical axis (Z-axis) direction.

The magnet portion 410 may be disposed in the coil portion 430, and the magnet portion 410 may be slidably moved with respect to the coil portion 430. Accordingly, the magnet portion 410 may be moved parallel to the optical axis (Z-axis) direction while being supported by the coil portion 430.

Therefore, the lens module 100 may have an improved linearity even without any separate guide.

Figure 9:
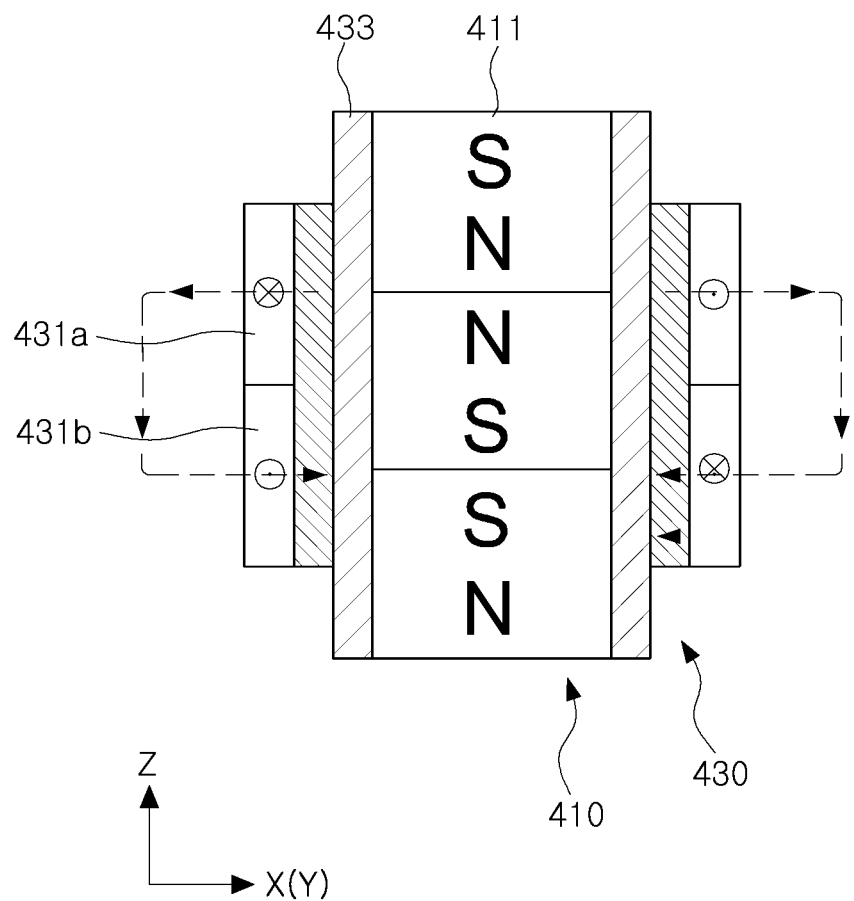
FIG. 9 is a cross-sectional view illustrating another example of the driving unit.

FIG. 9 is a cross-sectional view illustrating another example of the driving unit.

The magnet 411 may have at least three poles having a first polarity and at least three poles having a second polarity. In an example, the first polarity may be the polarity of the N pole or S pole, and in an example, the second polarity may be the polarity of the S pole or N pole, which is opposite to the first polarity.

In an example, the magnet 411 may have at least three N poles and at least three S poles.

The magnet 411 may allow their poles having the same polarity to face each other. That is, the poles having the first polarity may be disposed to face each other, or the poles having the second polarity may be disposed to face each other.

In an example, the magnet 411 may have a shape in which the S pole, the N pole, the N pole, the S pole, the S pole and the N pole are arranged in the optical axis (Z-axis) direction. Alternatively, the magnet 411 may have a shape in which the N pole, the S pole, the S pole, the N pole, the N pole and the S pole are arranged in the optical axis (Z-axis) direction.

In an example, the magnet 411 may be a single magnet. However, this is a non-limiting example, since the magnet 411 may have a shape in which three or more magnets are coupled with one another.

The coil member 431 may include at least two coils. In an example, the coil member 431 may include a first coil 431a and a second coil 431*b*. The first coil 431*a* and the second coil 431*b* may each be disposed on an outer surface of the coil housing 433.

Each of the coils may be a winding coil, and may be wound on the outer surface of the coil housing 433 for example.

The first coil 431*a* and the second coil 431*b* may each be disposed in the optical axis (Z-axis) direction. The current flow direction of the first coil 431*a* and the current flow direction of the second coil 431*b* may be opposite.

In an example, the first coil 431*a* and the second coil 431*b* may have the current flow directions that are opposite to each other.

Referring to FIG. 9, the magnet 411 may be implemented to have the poles with the same polarity face each other. Therefore, a magnetic field between the poles having the same polarity and facing each other may have a direction perpendicular to the optical axis (Z-axis).

In an example, the magnet 411 may have three N poles and three S poles, with two N poles facing each other among the three N poles. Therefore, the magnetic field may be formed between the two N poles facing each other from the magnet 411 toward the coil member 431 in the direction perpendicular to the optical axis (Z-axis).

Additionally, the magnet 411 may have two S poles facing each other among the three S poles. Therefore, the magnetic field may be formed between the two S poles facing each other from the coil member 431 to the magnet 411 in the direction perpendicular to the optical axis (Z-axis).

In an example, the first coil 431*a* may be disposed to face the N pole of the magnet 411. In an example, the first coil 431*a* may be disposed to face the two N poles facing each other among the three N poles of the magnet 411.

In an example, the second coil 431*b* may be disposed to face the S pole of the magnet 411. In an example, the second coil 431*b* may be disposed to face the two S poles facing each other among the three S poles of the magnet 411.

The first coil 431*a* and the second coil 431*b* may have current flow directions that are opposite to each other.

Therefore, a driving force may be generated by an interaction between the magnet 411 and the coil member 431 in the optical axis (Z-axis) direction.

In the camera module 1, in accordance with one or more embodiments, the coil member 431 may include an even number of coils when the magnet 411 has an odd number of poles having the first polarity and an odd number of poles having the second polarity.

Referring to FIG. 9, the magnet 411 may have three N poles and three S poles, and the coil member 431 may include two coils.

The coil member 431 may include the even number of coils even when an odd number of magnets are coupled to each other instead of one magnet.

Figure 10:
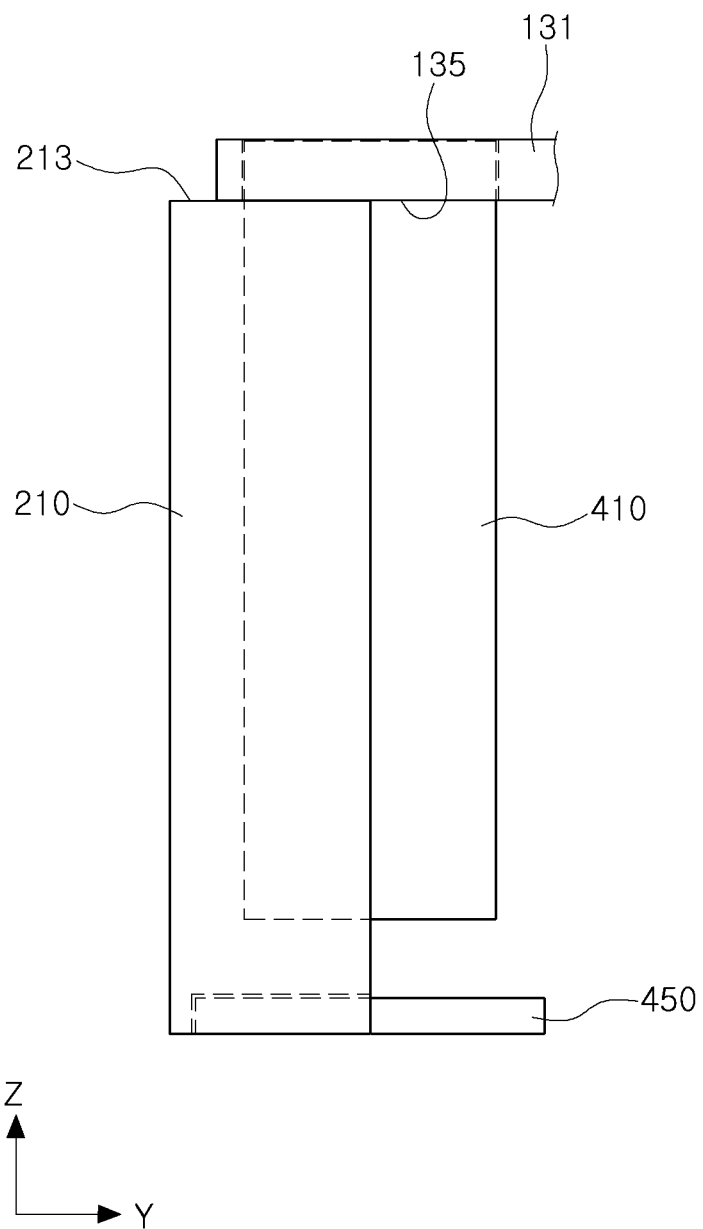
FIG. 10 is a view illustrating a stopper of an example camera module, in accordance with one or more embodiments.

FIG. 10 is a view illustrating a stopper of an example camera module, in accordance with one or more embodiments.

Referring to FIG. 10, the pulling yoke 450 may be disposed to face the magnet portion 410 in the optical axis (Z-axis) direction.

An attractive force may be generated between the pulling yoke 450 and the magnet portion 410 in the optical axis (Z-axis) direction, thereby preventing the lens module 100 from being deviated outward from the housing 200.

In an example, when power is not applied to the coil portion 430, the pulling yoke 450 and the magnet portion 410 may be disposed to be spaced apart from each other in the optical axis (Z-axis) direction.

In an example, when power is not applied to the coil portion 430, the attractive force between the pulling yoke 450 and the magnet portion 410 may allow a bottom surface 135 of the protrusion 131 of the carrier 130 and a top surface 213 of the mounting portion 210 of the housing 200 to be brought into contact with each other.

That is, the bottom surface 135 of the protrusion 131 of the carrier 130 and the top surface 213 of the mounting portion 210 of the housing 200 may be disposed to face each other in the optical axis direction. Additionally, the protrusion 131 may be disposed above the mounting portion 210 in the optical axis direction.

Therefore, although an attractive force may be generated between the pulling yoke 450 and the magnet portion 410, it is possible to prevent the pulling yoke 450 and the magnet portion 410 from colliding with each other.

The bottom surface 135 of the protrusion 131 of the carrier 130 and the top surface 213 of the mounting portion 210 of the housing 200 may function as a stopper together.

A cushioning member may be disposed on at least one of the bottom surface 135 of the protrusion 131 of the carrier 130, and the top surface 213 of the mounting portion 210 of the housing 200. The cushioning member may be an elastic body. Therefore, it is possible to reduce impact and noise when the bottom surface 135 of the protrusion 131 of the carrier 130 and the top surface 213 of the mounting portion 210 of the housing 200 are brought into contact with each other.

Figure 11:
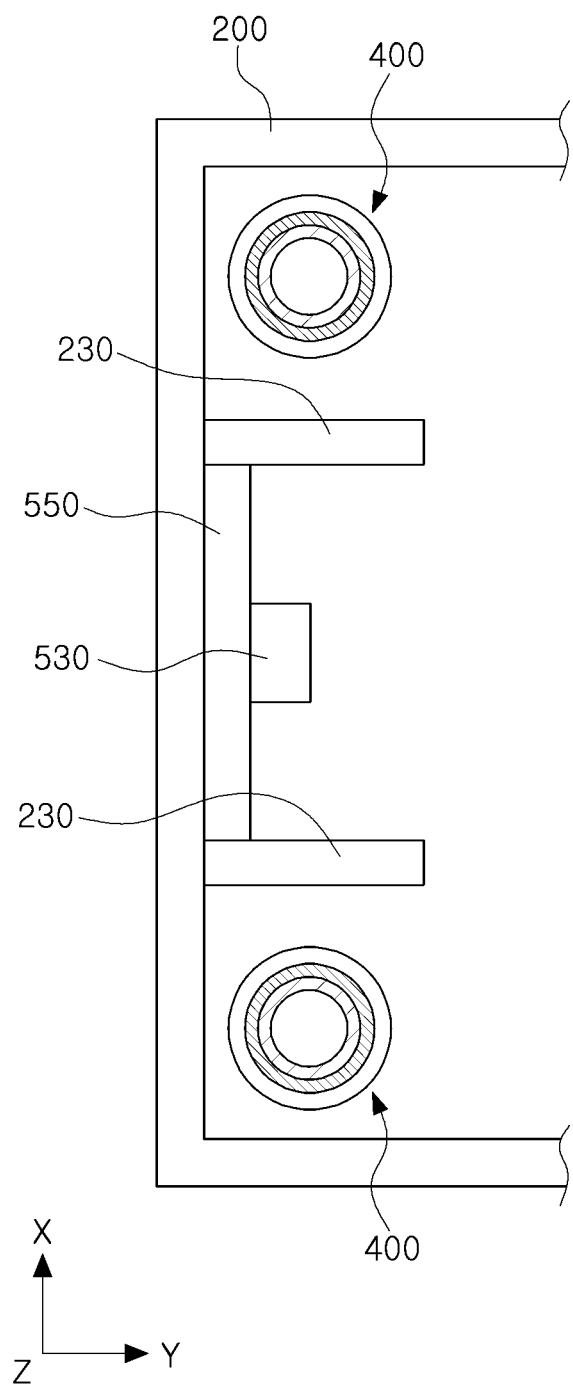
FIG. 11 is a view illustrating a shielding structure of a position detection unit in an example camera module, in accordance with one or more embodiments.

FIG. 11 is a view illustrating a shielding structure of the position detection unit in the camera module, in accordance with one or more embodiments.

Referring to FIG. 11, two driving units 400 may be provided, and the two driving units 400 may respectively be disposed in opposite corner regions of one inner surface of the housing 200. Additionally, the position detection unit 500 may be disposed between the two driving units 400.

A shielding wall 230 may be disposed in a space between the two driving units 400 and the position detection unit 500. In an example, the shielding wall 230 may protrude from an inner surface of the housing 200, and may be disposed in the space between the two driving units 400 and the position detection unit 500.

Therefore, the shielding wall 230 may prevent magnetic field interference from occurring between the position detection unit 500 and the driving unit 400.

Figure 12:
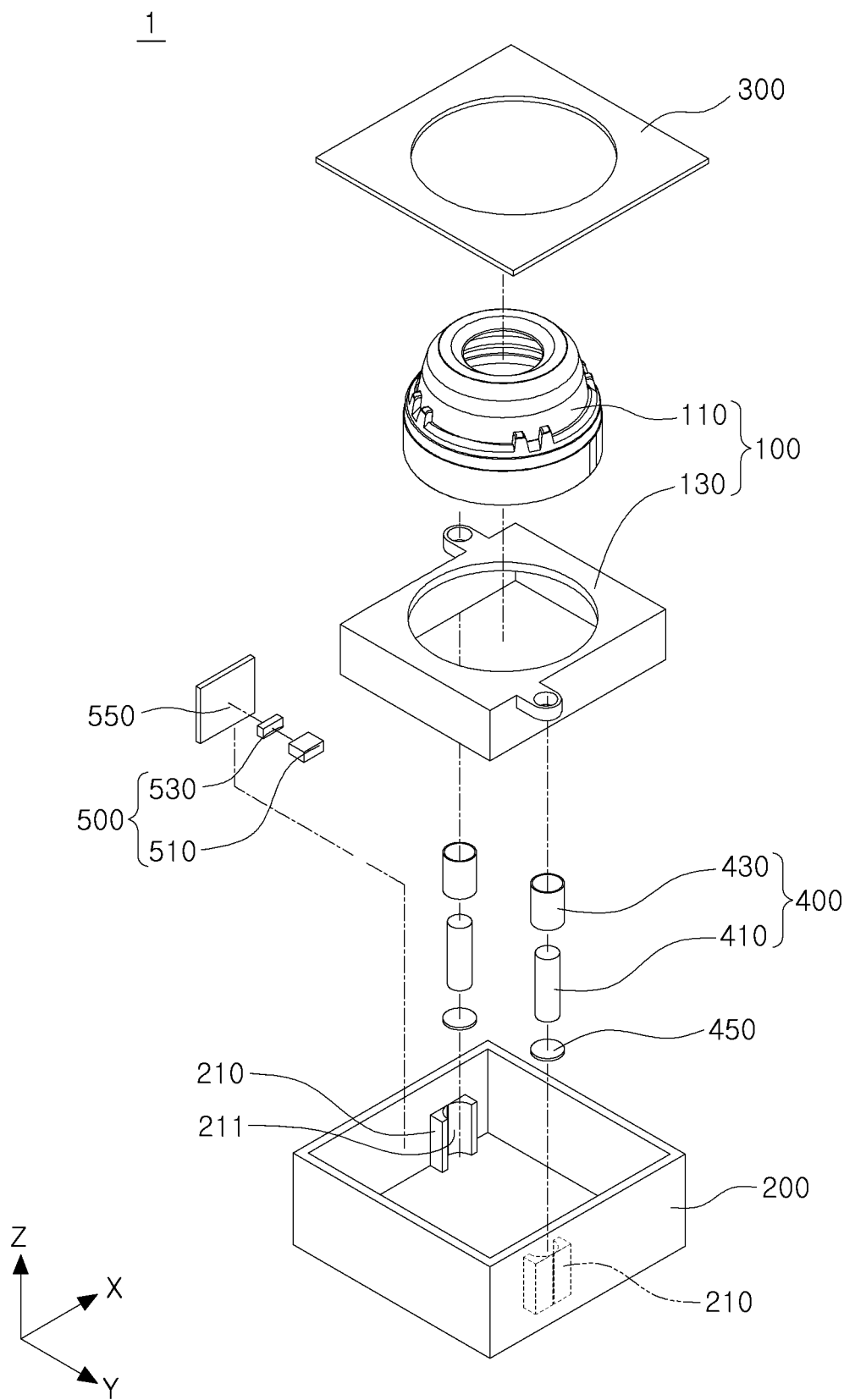
FIG. 12 is an exploded perspective view of an example camera module, in accordance with one or more embodiments.
Figure 13:
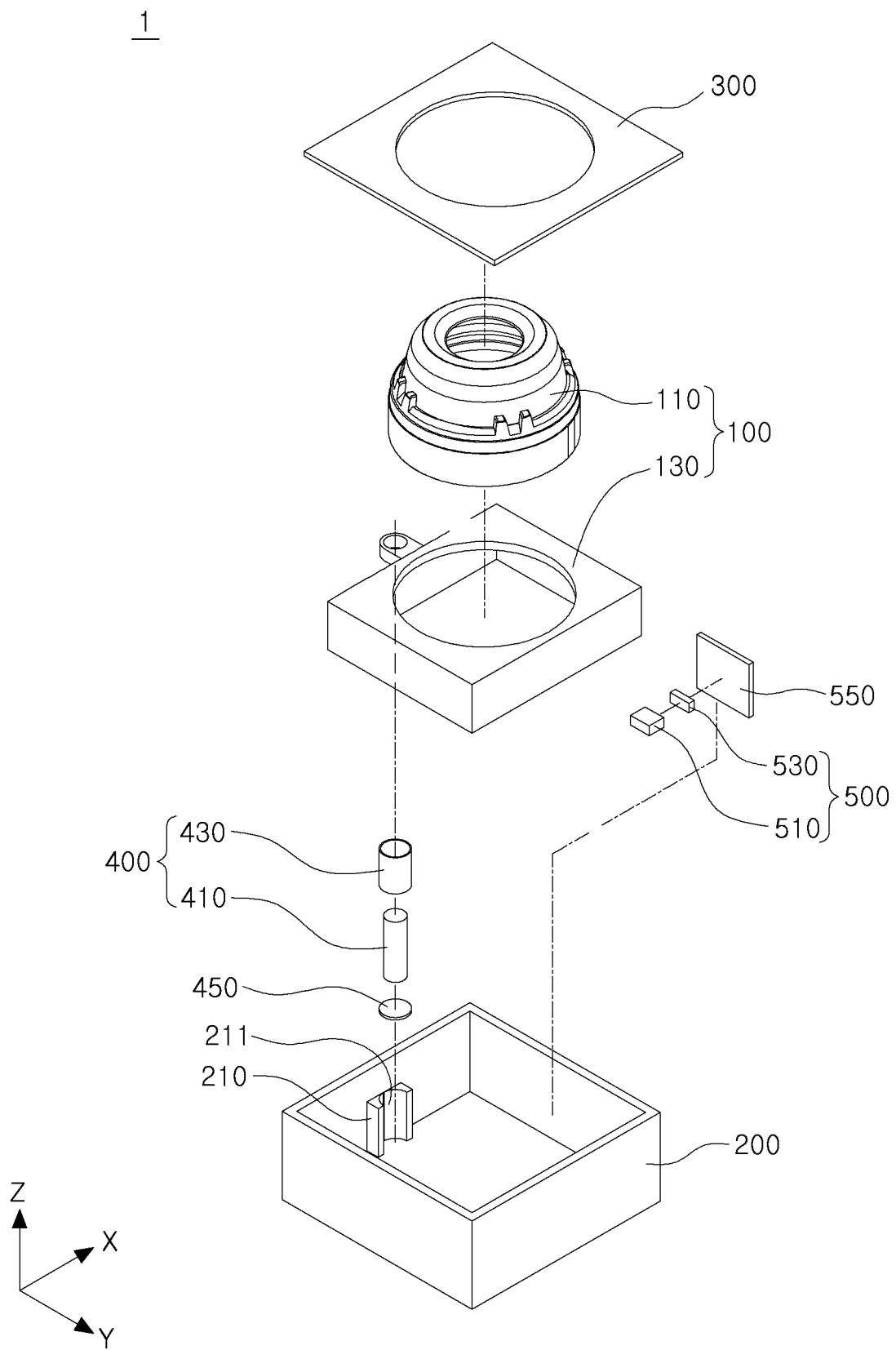
FIG. 13 is an exploded perspective view of a camera module according to still another exemplary embodiment in the present disclosure.

FIG. 12 is an exploded perspective view of an example camera module, in accordance with one or more embodiments; and FIG. 13 is an exploded perspective view of an example camera module, in accordance with one or more embodiments.

The example illustrated in FIG. 12 and the example illustrated in FIG. 13 are each different from the example illustrated in FIG. 4 with regard to a shape or a position in which the driving unit 400 is disposed.

First, referring to FIG. 12, two driving units 400 may be provided, and the two driving units 400 may be disposed diagonally from each other with respect to the optical axis (Z-axis). However, this is only an example, and more than two driving units 400 may be provided.

Therefore, driving forces of the driving units 400 may stably move the lens module 100 in the optical axis (Z-axis) direction.

Referring to FIG. 13, one driving unit 400 may be provided, and the one driving unit 400 may be disposed to be perpendicular to the optical axis (Z-axis).

As set forth above, the camera module according to an example may have the improved linearity when the lens module is moved in the optical axis direction.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a lens module;
a housing, configured to accommodate the lens module;
a pulling yoke; and
a driving unit comprising a magnet portion disposed on the lens module, and a coil portion disposed on the housing, and configured to move the lens module along an optical axis,
wherein the coil portion is disposed to surround the magnet portion, and
wherein the pulling yoke is configured to bring a surface of a carrier, on which the magnet portion is fixed, into contact with a surface of a mounting portion of the housing to which the coil portion is fixed, and
wherein at least a part of the magnet portion is configured to be in contact with at least a part of the coil portion.

2. The camera module of claim 1, wherein the magnet portion comprises a magnet comprising an even number of north (N) poles and south (S) poles, and the coil portion comprises an odd number of coils.

3. The camera module of claim 1, wherein the magnet portion comprises a magnet having at least one of two north (N) poles facing each other, and two south (S) poles facing each other.

4. The camera module of claim 3, wherein the magnet is configured to have one of an S pole, an N pole, an N pole and an S pole, sequentially arranged in an optical axis direction, and the N pole, the S pole, the S pole and the N pole, sequentially arranged in the optical axis direction.

5. The camera module of claim 3, wherein the coil portion comprises a first coil, a second coil and a third coil, arranged in an optical axis direction,
wherein a polarity of a magnet of the magnet portion that faces the first coil is different from a polarity of a magnet of the magnet portion that faces the second coil, and
the polarity of the magnet of the magnet portion that faces the second coil is different from a polarity of a magnet of the magnet portion that faces the third coil.

6. The camera module of claim 5, wherein the first coil and the second coil are configured to have current flow directions opposite to each other, and
wherein the second coil and the third coil are configured to have current flow directions opposite to each other.

7. The camera module of claim 1, wherein the magnet portion comprises a magnet having an odd number of north (N) poles and south (S) poles, and the coil portion comprises an even number of coils.

8. The camera module of claim 7, wherein the magnet comprises two N poles facing each other, and two S poles facing each other.

9. The camera module of claim 7, wherein the magnet is configured to have one of a configuration in which the S pole, the N pole, the N pole, the S pole, the S pole and the N pole are sequentially arranged in an optical axis direction, and a configuration in which the N pole, the S pole, the S pole, the N pole, the N pole and the S pole are sequentially arranged in the optical axis direction.

10. The camera module of claim 8, wherein the coil portion comprises a first coil and a second coil, disposed in an optical axis direction,
wherein a polarity of a magnet of the magnet portion that faces the first coil is different from a polarity of a magnet of the magnet portion that faces the second coil, and
wherein the first coil and the second coil are configured to have current flow directions that are opposite to each other.

11. The camera module of claim 1, wherein the magnet portion comprises a magnet and a magnet housing, the magnet being disposed in the magnet housing, and
wherein the coil portion comprises a coil member and a coil housing, the coil member being disposed on an outer surface of the coil housing.

12. The camera module of claim 11, wherein the magnet portion is sliding-moved with respect to the coil portion.

13. The camera module of claim 11, wherein the coil housing is an oilless bearing.

14. The camera module of claim 1, wherein the pulling yoke is disposed to be spaced apart from the magnet portion in an optical axis direction.

15. The camera module of claim 1, wherein a protrusion to which the magnet portion is fixed is disposed on the lens module, and
wherein a mounting portion to which the coil portion is fixed is disposed in the housing,
wherein the protrusion is disposed above the mounting portion in an optical axis direction, and
wherein a bottom surface of the protrusion and a top surface of the mounting portion are configured to face each other in the optical axis direction.

16. The camera module of claim 1 further comprising a position detection unit, configured to detect a position of the lens module, wherein the position detection unit comprises a sensing yoke disposed on the lens module and a position sensor disposed to face the sensing yoke.

17. The camera module of claim 16, wherein a shielding wall is disposed in an area between the driving unit and the position detection unit.

18. A camera module, comprising:
a lens module, comprising at least one lens;
a housing, configured to accommodate the lens module;
a pulling yoke; and
a driving unit, comprising a magnet portion disposed on the lens module and a coil portion disposed on the housing, and configured to move the lens module along an optical axis,
wherein the coil portion is configured to have a cylindrical shape, and the magnet portion is disposed in an inner area of the coil portion, wherein at least a part of the magnet portion is configured to be in contact with at least a part of the coil portion, and wherein the pulling yoke is configured to bring a surface of a carrier, on which the magnet portion is fixed, into contact with a surface of a mounting portion of the housing to which the coil portion is fixed.

19. An electronic device, comprising: a camera module, comprising:
a housing;
a lens module;
a pulling yoke; and
one or more driving units, each driving unit comprising a magnet portion disposed on the lens module, and a coil portion disposed on the housing, and configured to move the lens module along an optical axis;
wherein the magnet portion comprises two or more magnets coupled to each other, and disposed in an optical axis direction,
wherein the magnet portion is disposed in an internal area of the coil portion,
wherein at least a part of the magnet portion is configured to be in contact with at least a part of the coil portion, and
wherein the pulling yoke is configured to bring a surface of a carrier, on which the magnet portion is fixed, into contact with a surface of a mounting portion of the housing to which the coil portion is fixed.

20. The electronic device of claim 19, wherein the two or more magnets are configured to have at least two first polarities, and at least two second polarities.

21. The electronic device of claim 20, wherein poles of the two or more magnets having the first polarity are disposed to face each other, and poles of the two or more magnets having the second polarity are disposed to face each other.

22. The electronic device of claim 19, wherein the coil portion comprises coil members including an odd number of coils when an even number of magnets are coupled to each other.

23. The electronic device of claim 19, wherein the one or more driving units further include a pulling yoke disposed to face the magnet portion in the optical axis direction.

24. The electronic device of claim 19, wherein the magnet portion and the coil portion are configured to slidably move with respect to each other.

25. The electronic device of claim 19, wherein the magnet portion is a movable member, and the coil portion is a fixed member.

* * * * *